United States Patent [19]

Heinzman

[11] Patent Number: 4,933,951
[45] Date of Patent: Jun. 12, 1990

[54] MINIMUM THERMAL ENVIRONMENT SENSOR

[75] Inventor: Homer W. Heinzman, Arlington, Tex.

[73] Assignee: LTV Aerospace and Defense Company, Dallas, Tex.

[21] Appl. No.: 230,854

[22] Filed: Aug. 10, 1988

[51] Int. Cl.⁵ ............................................... G01J 1/20
[52] U.S. Cl. ....................................... 374/210; 374/6; 250/203.1
[58] Field of Search ............................... 374/120–122, 374/124, 112, 133, 208, 210, 183, 185, 6; 165/32; 219/494, 502; 250/203 R, 203 S, 204; 244/158 A, 163, 171, 173

[56] References Cited

U.S. PATENT DOCUMENTS

| | | | |
|---|---|---|---|
| 3,162,764 | 12/1964 | Haviland | 244/171 |
| 3,206,141 | 9/1965 | Vivian et al. | 244/169 |
| 3,311,322 | 3/1967 | Zimmerman | 244/168 |
| 3,348,790 | 10/1967 | Crowder et al. | 244/1 |
| 3,535,521 | 10/1970 | Levine | 250/203 R |
| 3,630,020 | 12/1971 | Chase | 244/168 |
| 3,700,905 | 10/1972 | Parkin et al. | 250/203 R |
| 4,018,532 | 4/1977 | Fletcher et al. | 356/141 |
| 4,153,038 | 5/1979 | McDonald | 250/203 R |
| 4,316,084 | 2/1984 | Stout | 250/203 R |

FOREIGN PATENT DOCUMENTS 2463058 3/1981 France ................................ 244/163

Primary Examiner—William A. Cuchlinski, Jr.
Assistant Examiner—W. Morris Worth
Attorney, Agent, or Firm—Arnold, White & Durkee

[57] ABSTRACT

A planar thermal radiator for use in outer space is disclosed. The radiator is adapted to rotate on two mutually perpendicular x and y axes which are in x and y planes respectively that are perpendicular to each other and to the planar surfaces of the radiator. It utilizes a plurality of pairs of heat sensors wherein each heat sensor provides a value of electrical resistance which is representative of the incident heat energy along the sensitive axis of that heat sensor. A common heat sensor pair detects incident heat energy which is perpendicular to the radiator. A first plurality of heat sensor pairs is used to detect incident heat energy along sensitive axes that are parallel to the x-plane and a second plurality of heat sensor pairs is used to detect incident heat energy along sensitive axes that are parallel to the y-plane. One sensor of each heat sensor pair is mounted on the opposite surface of the radiator. Each heat sensor pair has an associated heat sensor pair in its respective plurality. Each heat sensor pair and its associated heat sensor pair is mounted to detect incident thermal energy which is impinging at equal but opposite angles with respect to the axis that is perpendicular to the radiator. Each pair is electrically connected in series. During operation, the series resistance of each heat sensor pair is measured and the sensitive axis of the common heat sensor pair is oriented in the direction of the sensitive axis of the sensor pair that has the least series resistance value. The radiator is then rotated until the difference between the value of the series resistance of each heat sensor pair and its associated heat sensor pair is nearly zero.

10 Claims, 3 Drawing Sheets

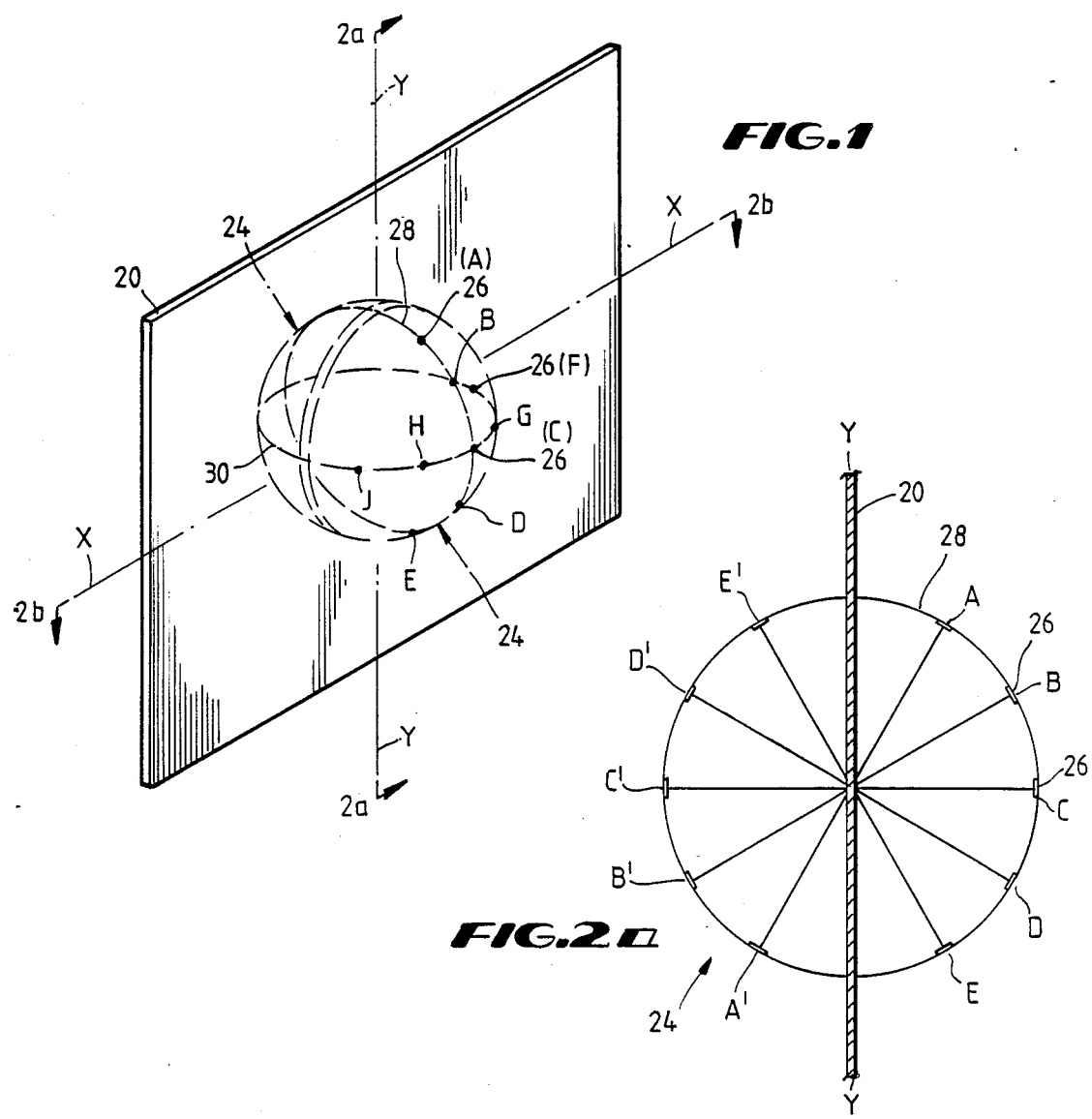
FIG. 1
FIG. 2a
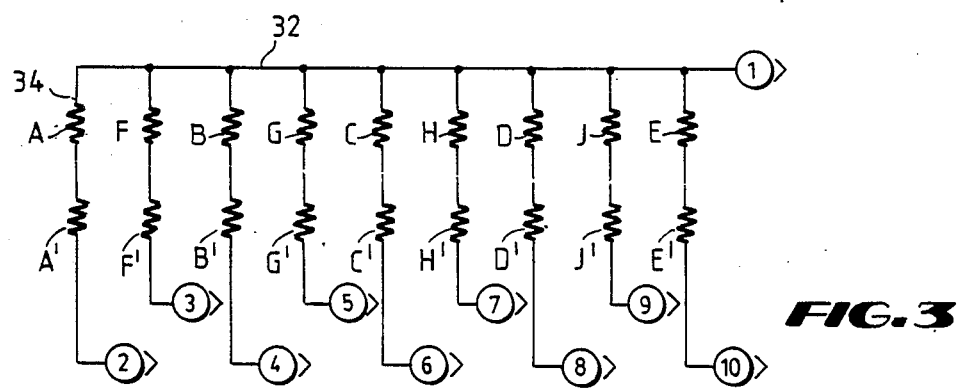
FIG. 3

MINIMUM THERMAL ENVIRONMENT SENSOR

BACKGROUND OF THE INVENTION

The present invention relates to a thermal radiator free to rotate on two mutually perpendicular axes and, more particularly, to apparatus and method of detecting the direction of minimum incident thermal radiation and continually orienting the thermal radiator until it receives the minimum of incident radiation upon its radiating surfaces.

A thermal radiator in a space environment void of atmosphere is a device which radiates or loses heat by emitting electromagnetic waves. Emission of electromagnetic waves reduces the temperature of the device provided the incident electromagnetic wave energy impinging on the device is less than the electromagnetic wave energy emitting from the device. The rate at which thermal energy, or heat, emits from a radiating body is also a function of the surface area of the device body and the surrounding heat energy.

For a thermal radiator employed in space, it is desirable to continually detect the direction of minimum incident radiation and orient the radiator so its radiation emitting surfaces are perpendicular to the direction of minimum incident radiation. Such an arrangement would enable the radiator to emit heat away from its body in an efficient manner. A radiator of reduced size may then be used since a minimum of incident radiation is impinging on the surface of the radiator.

The present invention provides an apparatus and method for detecting the direction of minimum incident radiation and orienting a thermal radiator to a position whereby a minimum of thermal radiation is received on the radiating surfaces of the radiator. In this position the radiator is in a minimum thermal environment.

SUMMARY OF THE INVENTION

Apparatus to orient a planar thermal radiator in outer space is disclosed. Two hemispherical members are mounted back-to-back on the radiator to form a sphere which has a common diameter perpendicular to the radiator and two great circles which lie on separate planes perpendicular to each other and to the radiator. Separate common heat sensors are mounted on the sphere at the opposite ends of the common diameter and are electrically connected in series. Pairs of diametrically opposite heat sensors are mounted on each great circle there being at least one heat sensor on the opposite sides of and at equal distance from each common heat sensor and each pair being electrically connected in series. The circuit utilized in the system measures the resistance of each pair and determines the pair having the least resistance. The system then rotates the radiator to orient the common diameter in the direction of the sensor pair having the least resistance. This orients the radiator in the general direction of the minimum incident heat radiation. Further fine tuning is done by rotating the radiator in space until the differences in resistance of the sensor pairs which are equidistant from the common diameter are nearly zero.

In another configuration, pairs of sensors are attached to various points on the surfaces of the radiator. Wedges support the sensors and define the angle of incident radiation detected by the sensors.

Examples of the more important features of this invention have thus been summarized rather broadly in order that the detailed description thereof that follows may be better understood, and in order that the contribution of the art may be better appreciated. There are, of course, additional features of the invention that will be described hereinafter and which will also form the subject of the claims appended hereto.

These and other features and advantages of the present invention will become apparent with reference to the following detailed description of a preferred embodiment thereof in connection with the accompanying drawings wherein like reference numerals have been applied to like elements, in which:

BRIEF DESCRIPTION OF THE DRAWINGS

FIG. 1 illustrates a planar radiator with a spherical surface being an integral part of the radiator.

FIG. 2a is a sectional view of FIG. 1 through an axis Y—Y. Letters A through E depict heat sensors on a first circumference of the sphere.

FIG. 3 illustrates how the heat sensors are electrically connected together.

DESCRIPTION OF THE PREFERRED EMBODIMENT

Figure 2B:
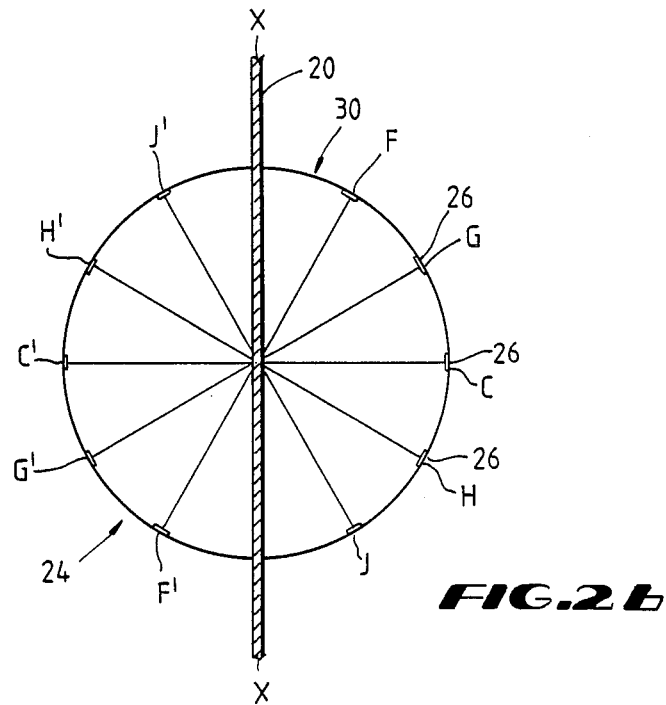
FIG. 2b is a sectional view of FIG. 1 through an axis X—X. Letters F, G, C, H and J depict heat sensors on a second circumference of the sphere.

A planar radiator having a plurality of temperature sensors mounted along two axes of a spherical body affixed to the radiator, and the corresponding electrical circuit for continually orienting the radiator in the minimum space thermal environment are disclosed. The method continually orienting the radiator in the minimum space thermal environment is also disclosed.

Referring to FIGS. 1 and 2, a thermal radiator 20 having a planar thermal panel of desired dimensions supports first and second hemispherical bodies 24. The first and the second hemispheres are mounted back-to-back on the panel to form a sphere. A plurality of heat sensing devices (heat sensors) 26 are mounted on the surface of the sphere along two circumferences or great circles. In this manner, a number of the sensors 26 lie on a first circumference 28 or a first great circle. The remaining sensors lie on second circumference 30 or second great circles. The plane of the first circumference is perpendicular to the plane of the second circumference. The plane of the first and second circumference is perpendicular to the plane of the radiator. The points of intersection C and C' of the two great circles define their common points which lie on the opposite end of a common diameter perpendicular to the radiator. The heat sensors are mounted on the semi-spherical bodies approximately 30° apart The radiator panel 20 rotates about an axis Y—Y which coincides with the diameter of the first circumference 28. The radiator also rotates about a second axis X—X which is a diameter of the second circumference 30. The axis X—X is at right angles to the axis Y—Y as illustrated in FIG. 1.

A heat sensor is generally a metal element made out of tungsten alloy. The electrical resistance of such a heat sensor changes linearly over a wide range of temperatures with the changes in the temperature of the sensor element.

FIG. 2a is a sectional view through the axis Y—Y of FIG. 1. Heat sensors A through E are mounted or affixed at about 30° intervals on the circumference of the sphere. The heat sensitive sensors A' through E' are illustrated at 30° intervals, diametrically opposite their respective sensors A through E. It will be noted that intervals other than 30° may be related in the actual application. Each sensor is electrically connected in series to its respective prime lettered sensor as illustrated in FIG. 3, i.e., A and A', B and B', etc. are connected in series.

FIG. 2b illustrates a view similar to the view of FIG. 2a through the X—X axis of FIG. 1. In this view the heat sensors F, G, C, H and J are depicted and these are electrically connected in series to their respective diametrically opposed sensors F', G', C', H' and J' as illustrated in FIG. 3. Sensors C and C' lie on the axis perpendicular to the radiator panel which passes through the center of the sphere. Thus, the sensors C and C' are common to both the circumferences and are mounted on the opposite ends of the common diameter perpendicular to the radiator.

FIG. 3 depicts the electrical interconnection of all the heat sensors A through J used in the system. The letters A through J and A' through J' in FIG. 3 represent the sensors depicted in the form of resistors. Sensors A and A', are mounted on the same circumference of the sphere but diametrically opposite each other and are electrically connected in series as illustrated in FIG. 3. Similarly all other pairs, i.e., FF', BB', etc. are serially connected to each other. One end of each sensor in the first hemisphere, i.e., one end of each sensor A through J is connected to a common node via conductor 32.

Figure 4:
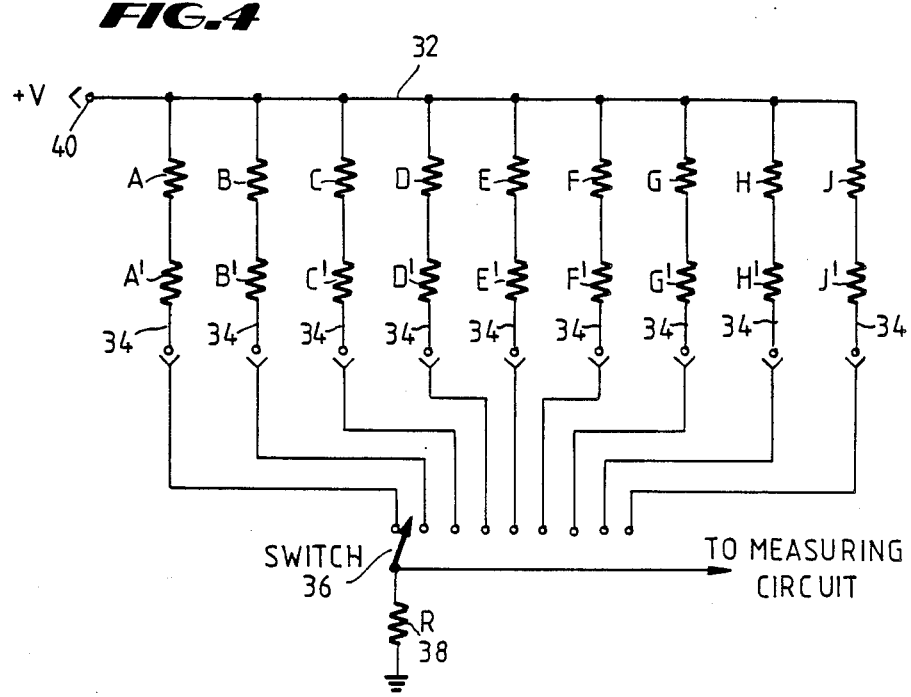
FIG. 4 illustrates how each segment of the circuit in FIG. 3 is sequentially switched and connected to a measuring circuit.

Now, referring to FIG. 4, the end 34 of each serially connected pair of sensors sequentially connect to the contacts of a switch 36. The wiper of the switch 36 sequentially connects each resistor pair in series with a fixed resistor 38 of value R. Although a mechanical switch is depicted and described it will be understood that an equivalent solid state switch may be used to multiplex each series resistor pair into the measuring circuit. An electric power source supplies power to each sensor via a terminal 40 and the conductor 32. A circuit measuring device, not shown, measures the potential difference across the resister 38.

Figure 5:
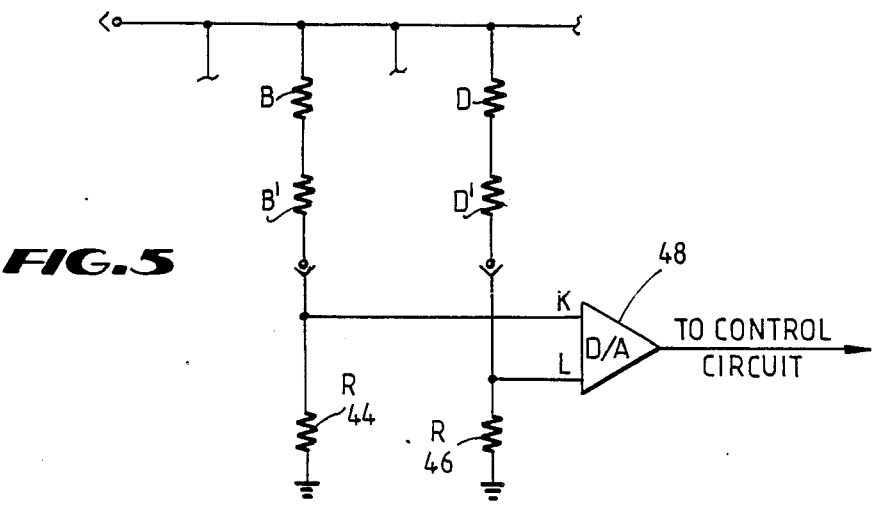
FIG. 5 depicts a differential amplifier comparing the radiation received by two selected pairs of sensors.

FIG. 5 illustrates a measuring circuit which utilizes a differential amplifier 48 for comparing the thermal radiation received by two selected pairs of sensors BB' and DD'. The sensor pairs BB' and DD' are referenced to as corresponding sensor pairs in that B and D correspond to each other and that B' and D' correspond to each other. It will be noted that the corresponding sensor pairs BB' and DD' are mounted on the same circumference and are radially equidistant from the common sensor pair CC'. i.e., sensors B and D are mounted on the same circumference in one hemisphere on the opposite sides of and equidistant from the common sensor (point) in its hemisphere. The remaining corresponding sensor pairs, i.e., AA' and EE', GG' and HH', and FF' and JJ' are similarly mounted on the sphere and connected to the measuring circuit for determining the temperature differential between corresponding sensor pairs by measuring the difference in the series resistance of corresponding sensor pairs. Such an arrangement, when symmetrical about the two circumferences, enables one to use a relatively small number of heat sensors to determine the total minimum heat environment around the radiator. The series resistor pairs B,B' and D,D' provide a current path through resistors 44 and 46 respectively. The resistor 44 has the same value of resistance R as resistor 46.

Since resistors 44 and 46 are equal, the potential at K represents the sum of the series resistance of the resistors B and B' and the potential at L represents the sum of the series resistance of the resistors D and D' Differential amplifier 48 compares the inputs at K and L and sends the output which is proportional to the difference in the resistance between pairs BB' and DD' and hence the temperature to a control circuit not shown. Differential amplifier 48 may be a single amplifier able to select any pair of sensors as selected by a supervisory control system or each pair of sensors may have its own differential amplifier whose output may be selected for driving the radiator direction controlling device also under the control of a supervisory control system.

As noted earlier, the heat sensitive sensors 26 are made from a material with a high positive temperature coefficient which is linear over a wide temperature range. The sensors are precision trimmed to have a specified resistance at a predetermined temperature. Metals such as nickel, platinum, nicrome and the like are examples of materials which have a high positive temperature coefficient and are linear over a wide temperature range. By having the above characteristics the heat sensitive sensors 26 have a resistance value which is representative of their temperature. The size and shape of the sensors may be a variety of forms such as oval, rectangular, contoured and the like.

The thermal environment around the radiator is minimum when the planar surface of the radiator is orthogonal to the direction of the total minimum incident radiation. The system of the invention utilizes a two step procedure to orientate the radiator panel to achieve a minimum thermal environment around the radiator. The first step or the gross orientation is obtained by first sequentially measuring the resistance of each resistor pair illustrated in FIG. 4. The radiator is rotated about its axes to align the sensor pair CC' in the direction of the resistor pair that had the minimum series resistance. The radiator panel is thus oriented in a direction perpendicular to the direction of the minimum incident thermal radiation.

Finally, using the differential amplifier circuit illustrated in FIG. 5, the radiator is rotated on the X—X axis until the resistance of the corresponding sensor pairs on the first circumference is equal, i.e., the resistance of the sensor pair BB' equals the resistance of sensor pair DD', etc.. The radiator is rotated on the Y—Y axis until the resistance of the corresponding sensor pairs mounted on the second circumference is equal, i.e., the resistance of the sensors G and G' equals the resistance of the sensors H and H', etc., etc.

As an example, if B is closer to the minimum incident radiation axis than D the series resistance of the sensor pair B—B' is lower than the series resistance of the sensor pair D—D'. More current flows through the resistor 44 than the resistor 46. The potential K across the resistor 44 is therefore higher than the potential across resistor 46. This difference is amplified and passed onto the control circuit, not shown, and the radiator is turned so that D moves towards B. When the radiation received by the sensors D—D' equals the radiation received by the sensors B—B' the series resistance of sensor pair D—D' will be equal to the series resistance of the sensor pair B—B'. K and L will be equal and the differential amplifier 48 will give zero output. The radiator remains stationary and the axis C—C' is in the direction of minimum incident radiation.

For a further aspect of this invention consider the failure of the resistor pair B,B' or D,D'. A controller, not shown, observes the next resistor pairs A,A' and E,E'. Rotating the radiator until resistor pair A,A' equals resistor pair E,E' orientates the radiator to a similar position determined by the resistor pairs B,B' and D,D' had they not failed.

Although a sphere has been disclosed to support the heat sensor pairs, other methods of mounting the heat sensors may be used. Heat sensors may be mounted on pyramids, wedges, geodesic domes, polygons or rods and the like. Further, the placement of the heat sensors does not need to conform to any predefined shape; they may be placed randomly on or around the radiator panel. Additionally, the size and shape of the sensors may be of a variety of forms such as oval, rectangular, contoured. the opposite surface. A line RB represents an axis (generally referred to as the sensitive axis) along which a sensor mounted on the wedge B receives and detects incident thermal radiation. Similarly, lines VC, TD, SB', WC' and UD' represent axes along which each sensor, respectively mounted on wedges C, D, B', C' and D', receive incident thermal radiation. The relationships among the sensors which are important to the proper operation of the device are: (1) The sensitive axes of sensors forming pairs are parallel to each other (2) The sensitive axes of complementary (associated) pairs have equal and opposite angles from the perpendicular axis of the panel, and (3) The heat sensors are oriented to provide detection of the total sphere of incident radiation. Thus, axes RB and SB' are parallel, and the axes RB and TD have equal and opposite angles from the perpendicular axis of the panel. The sensor pair CC' simply defines incident radiation perpendicular to the planar surface. It will be noted that any number of sensor pairs may be mounted by maintaining the relationship among the sensor pairs and their associated pairs as defined above and illustrated in FIG. 6. Also, different sensor pairs may have different angular placement in relation to the perpendicular axis CC'.

Figure 6:
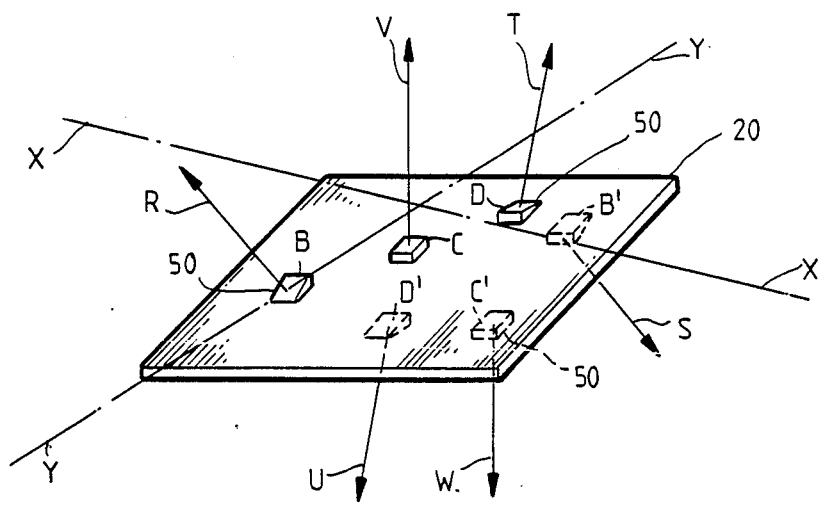
FIG. 6 illustrates a planar radiator with pairs of sensors mounted on wedges at various points on the Planar Surfaces of the radiator.

During operation, the planar radiator of FIG. 6 rotates about two mutually perpendicular axes X—X and Y—Y. The axes X—and Y—Y are preferably parallel to the plane of the radiator. Two imaginary planes, one parallel to the X—X axis and referred to as the X-plane, the other parallel to the Y—Y axis and referred to as the Y-plane, are perpendicular to the plane of the radiator. The X-plane and the Y-plane provide a datum against which the angles of the various axes of the heat sensors may be established. The axes VC and WC' are perpendicular to the plane of the radiator and hence parallel to both the X-plane and the Y-plane. Axes RB, SB', TD and UD' are parallel with the Y-plane but subtend angles of about 30° to the X-plane, the angle of TD being on the opposite side of the X-plane to the angle subtended by RB.

Sensors A—A' and E—E' (not shown) are mounted in a similar way to sensors B—B' and D—D', but with axes at an angle different from that of B—B' or D—D'. Unprimed letters refer to sensors on one side of the planar radiator and primed letters refer to sensors on the opposite side of the planar radiator. The axis of an unprimed sensor is parallel to the axis of its primed lettered sensor. The axis of the A sensor subtends an angle of, for example, 60° from the X-plane. The axis of the B sensor is mounted at the same angle as the A sensor, but the angle is measured from the opposite side of the X-plane. The axes of the A and the B sensors are parallel to the Y-plane. Sensor pairs F—F', G—G', H—H' and J—J' (not shown) are mounted on the surfaces of the radiator. These are positioned such that the axes of the heat sensors are parallel to the X-plane and subtend angles to the Y-plane as hereinafter described. The axes of heat sensors G and H are about 30° from the Y-plane, heat sensor G having its angle measured on the opposite side of the Y-plane relative to the angle of heat sensor H. The axes of heat sensors F and J are about 60° from the Y-plane, the angle of the axis of F being the same side of the Y-plane as the angle of the axis of G, and the angle of the axis of J being on the same side of the Y-plane as the angle of the axis of H.

As can be seen, the various axes along which the heat sensors detect radiation are in a similar pattern to the axes of the heat sensors mounted in the sphere as described earlier and illustrated in FIG. 1, FIG. 2a and FIG. 2b. The sensor pair C—C' of FIG. 6 detects the radiation incident to the perpendicular axis of the plane of the planar radiator. For the radiator to be in the position to receive minimum radiation, sensors C and C' will receive the minimum radiation.

Each heat sensor has a similar axis of radiation detection with respect to the radiator of FIG. 6 as its corresponding letter designated for the spherical support configuration of FIG. 1, FIG. 2a and FIG. 2b. Similar electrical interconnections between the heat sensors of FIG. 6 connect the sensors to control circuitry such as is illustrated in FIG. 3, FIG. 4 and FIG. 5. The same principle which orientates the radiator with the spherical-mounted sensors orientates the radiator with the wedge-mounted sensors.

The number of sensor pairs may be less or more than the number used in the preferred embodiment. The angles of 30° and 60° are used by way of example and may be varied to suit the number of sensor pairs used.

Although the radiator illustrated in FIGS. 1 and 2 is of planar configuration, it will be understood that other configurations may be used. However, the efficiency of the invention will vary according to the particular configuration used.

It will be noted that the apparatus and the procedure of the present invention is equally applicable to orient the radiator body to where it is in the maximum thermal environment. To achieve this result the CC' pair is simply oriented in the direction of the pair having the maximum total resistance followed by the procedure of step two as outlined above.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. Apparatus for use in outer space utilizing heat sensors, each said heat sensor having a sensitive axis which defines the direction of incident thermal energy which is detected by that sensor, each said heat sensor providing a value of electrical resistance which is representative of the incident thermal energy on that heat sensor, said apparatus comprising:

(a) a planar thermal radiator having opposite surfaces, said radiator adapted to rotate about first and second mutually perpendicular axes;

(b) a common pair of heat sensors having a separate heat sensor mounted on the opposite surfaces of said radiator with its sensitive axis perpendicular to the radiator surface, the sensors in said common sensor pair being electrically connected in series;

(c) a first plurality of heat sensor pairs, each pair having a separate heat sensor mounted on the opposite surfaces of said radiator, the sensitive axes of sensors in each said pair in said first plurality being parallel to each other and to a first plane which is perpendicular to said first axis and at a predetermined angle relative to the perpendicular sensitive axis of the common pair, each heat sensor pair in said first plurality also having an associated heat sensor pair in said first plurality, the sensitive axes of said associated heat sensor pairs being at the same angle as that of its associated pair but which is in opposite direction with respect to the sensitive axes of the common sensor pair, the sensors of each said pair in said first plurality being electrically connected in series to provide a separate value of series resistance of each said pair in said first plurality which is representative of the incident thermal energy on that sensor pair; and (d) a second plurality of heat sensor pairs, each pair having a separate heat sensor mounted on the opposite surfaces of said radiator, the sensitive axes of sensors in each said pair in said second plurality being parallel to each other and to a second plane which is perpendicular to said second axis and at a predetermined angle relative to the sensitive axes of the common sensor pair, each heat sensor pair in said second plurality also having an associated heat sensor pair in said second plurality, the sensitive axes of said associated heat sensor pairs being at the same angle as that of its associated pair but which is in opposite direction with respect to the sensitive axes of the common sensor pair, the sensors of each said pair in said second plurality being electrically connected in series to provide a separate value of series resistance of each said pair in said second plurality which is representative of the incident thermal energy on that sensor pair (e) a circuit for detecting the series resistance of the common heat sensor pair and the heat sensor pairs in the first and second pluralities.

2. The apparatus of claim 1 wherein said first and second pluralities have 2N and 2M said pairs of heat sensors respectively, N and M being positive integers.

3. The apparatus of claim 1 wherein each heat sensor in said common pair and first and second pluralities is mounted on a surface of a separate wedge, each said wedge also attached t a surface of the planar radiator, the angle of the sensor mounted surface of each said wedge with respect to the radiator surface defining the angle of t sensitive axis of the heat sensor mounted thereon with respect to the radiator surface.

4. The apparatus of claim 2 wherein N=M=1 and the sensitive axis of each said heat sensor in said first and second pluralities is at 30° with respect to the surface of said radiator on which that sensor is mounted.

5. A planar radiator for use in outer space, said radiator having opposite surfaces and adapted to rotate about first and second mutually perpendicular axes, said radiator utilizing heat sensors to detect directional incident thermal energy, each said heat sensor providing a value of electrical resistance which is representative of the incident thermal energy on that heat sensor, the direction of heat energy detected by each said sensor defining its sensitive axis, said radiator comprising:

(a) A common pair of heat sensors having a separate heat sensor mounted on the opposite surfaces of said radiator with its sensitive axis perpendicular to the radiator surface, the sensors in said common sensor pair being electrically connected in series;

(b) a first plurality of heat sensor pairs, each pair having a separate heat sensor mounted on the opposite surfaces of said radiator, the sensitive axis of each sensor in each said pair in said first plurality being at a predetermined angle to the surface on which it is mounted and also being parallel to each other and to a first plane which is perpendicular to said first axis, each heat sensor of each said pair in said first plurality also having an associated heat sensor in said first plurality, the sensitive axes of each said associated heat sensor being parallel to the first plane and at an angle to the radiator surface which is 180° minus the angle of the sensitive axis of its said associated heat sensor, the sensors of each said pair in said first plurality being electrically connected in series; and (c) a second plurality of heat sensor pairs, each pair having a separate heat sensor mounted on the opposite surfaces of said radiator, the sensitive axes of each sensor in each said pair in said second plurality being at a predetermined angle to the surface on which it is mounted and also being parallel to each other and to a second plane which is perpendicular to said second axis, each heat sensor of each said pair in said second plurality also having an associated heat sensor in said second plurality, the sensitive axis of each said associated heat sensor being parallel to the second plane and at an angle which is 180° minus the angle of the sensitive axis of its said associated heat sensor, the sensors of each said pair in said second plurality being electrically connected in series;

(d) circuit means for sequentially measuring the series resistance of the common heat sensor pair and each heat sensor pair in said first and second pluralities and to provide a unique electrical signal which corresponds to the series resistance of each said sensor pair for use in orienting the sensitive axis of the common heat sensor pair in the direction of the sensor pair having the least resistance; and (e) circuit means for determining the difference between the series resistance of each said heat sensor pair and its associated heat sensor pair to provide a unique electrical signal for each said difference for use in orienting the planar radiator in the direction where the total incident thermal radiation on the radiator is minimum.

6. The apparatus of claim 5 wherein the circuit means used to determine the difference between the series resistance of said sensor pairs comprises a differential amplifier.

7. The apparatus of claim 5 wherein the planar thermal radiator has a rectangular configuration.

8. The apparatus of claim 1 wherein each said first and second plurality has four said pairs of heat sensors and wherein the sensitive axis of one pair in each said plurality is at 30° with respect to the radiator surface and one pair in each said plurality is at 60° with respect to the radiator surface.

9. The apparatus of claim 5 wherein the predetermined angle of one pair of sensors in each said plurality is at 30° and one pair of sensors in each said plurality is at 60°.

10. A method of orienting a thermal radiator in outer space so that it receives minimum thermal energy, said thermal radiator having opposite planar surfaces, said radiator also adapted to rotate about mutually perpendicular x and y-axes, said x and y axes lying in x and y planes respectively, which are perpendicular to each other and to the planar surfaces of the radiator, said radiator utilizing he sensors, each heat sensor detecting thermal energy along a direction which defines the sensitive axis of that heat sensor, each heat sensor also providing a value of electrical resistance which is representative of the thermal energy detected by that sensor, said method comprising the steps of:

(a) measuring the series resistance of a pair of common heat sensors, one sensor each of the common sensor pair being mounted on the opposite surface of the radiator with its sensitive axis perpendicular to that planar surface;

(b) separately measuring the series resistance of a first pair of heat sensors and a first associated pair of heat sensors wherein one sensor each of the first pair and the first associated pair is mounted on the opposite planar surfaces of the radiator, the sensitive axes of the first pair and the first associated pair being parallel to the x-plane and also being at equal and opposite angles with respect to the sensitive axes of the common sensors;

(c) separately measuring the series resistance of a second pair of heat sensors and a second associated pair of heat sensors wherein one sensor each of the second pair and the second associated pair is mounted on the opposite planar surfaces of the radiator, the sensitive axes of the second pair and the second associated pair of heat sensors being parallel to the y-plane and also being at equal and opposite angles with respect to the sensitive axes of the common sensors;

(d) rotating the radiator until the sensitive axes of the common sensor are parallel to the direction of the sensitive axes of the pair of sensors that have the least value of the series resistance;

(e) measuring the difference between the series resistance of the first pair of heat sensors and the first associated pair of heat sensors, the second pair of heat sensors and the second associated pair of heat sensors; and (f) rotating the radiator until said differences are near zero.

* * * * *

UNITED STATES PATENT AND TRADEMARK OFFICE
CERTIFICATE OF CORRECTION

PATENT NO. : 4,933,951

DATED : June 12, 1990

INVENTOR(S) : Homer W. Heinzman

It is certified that error appears in the above-identified patent and that said Letters Patent is hereby corrected as shown below:

Column 4, line 10, after "D and D'" please insert a --.--.

Column 5, line 22, after "contoured" please insert --etc.
   FIG. 6 illustrates a planar radiator 20 having the
heat sensors mounted on wedges 50. The angle of a
wedge defines the axial position of the sensor relative
to the plane of the radiator. The wedges B, C and D
are mounted on one surface and the wedges B', C' and D'
are mounted on--.

Column 5, line 48, after "The axes" please delete "X-" and
   substitute --X-X-- therefor.

Column 7, line 58, please delete "t" and substitute --to--
   therefor.

Column 7, line 61, please delete "t" and substitute --the--
   therefor.

Column 9, line 15, please delete "he" and substitute
   --heat-- therefor.

Signed and Sealed this

Twenty-fifth Day of June, 1991

*Attest:*

HARRY F. MANBECK, JR.

*Attesting Officer*  *Commissioner of Patents and Trademarks*